(12) United States Patent
Paschen et al.

(10) Patent No.: US 8,018,371 B1
(45) Date of Patent: Sep. 13, 2011

(54) PASSIVE PROXIMITY SENSOR METHOD AND APPARATUS

(75) Inventors: Dean A. Paschen, Lafayette, CO (US); William G. Newhall, Boulder, CO (US); Mark C. Leifer, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 438 days.

(21) Appl. No.: 12/316,574

(22) Filed: Dec. 12, 2008

(51) Int. Cl.
  *G01S 13/04* (2006.01)
  *G01S 7/02* (2006.01)
  *G01S 13/00* (2006.01)

(52) U.S. Cl. ............. 342/90; 342/27; 342/82; 342/89; 342/175; 342/195

(58) Field of Classification Search ............ 342/13–20, 342/27, 28, 59, 60, 82–103, 118, 128–158, 342/175, 189, 192–197, 450–465, 25 R–26 A, 342/352–354
See application file for complete search history.

(56) References Cited

U.S. PATENT DOCUMENTS

| | | | | |
|---|---|---|---|---|
| 3,229,286 A | * | 1/1966 | Samuel et al. | 342/87 |
| 3,256,520 A | * | 6/1966 | Blitz | 342/128 |
| 3,641,573 A | * | 2/1972 | Albanese | 342/131 |
| 3,720,949 A | * | 3/1973 | Richter | 342/192 |
| 3,829,860 A | * | 8/1974 | Cutler et al. | 342/145 |
| 4,025,920 A | * | 5/1977 | Reitboeck et al. | 342/13 |
| 4,072,944 A | * | 2/1978 | Bianco et al. | 342/16 |
| 5,323,161 A | * | 6/1994 | Gailer et al. | 342/13 |
| 6,296,205 B1 | | 10/2001 | Hanson et al. | |
| 7,215,241 B2 | | 5/2007 | Ghazarian | |

OTHER PUBLICATIONS

Webster's Third New International Dictionary, unabridged and on-line, copyright in the year 1993, Merriam-Webster, Inc., definition of "communication.".*
H.D. Griffiths and C.J. Baker, "Passive coherent location radar systems. Part 1: Performance prediction", IEE Proc.-Radar Sonar Navig., vol. 152, No. 3, Jun. 2005, pp. 153-159.
C.J. Baker, H.D. Griffiths and I. Papoutsis, "Passive coherent location radar systems. Part 2: Waveform properties", IEE Proc.-Radar Sonar Navig., vol. 152, No. 3, Jun. 2005, pp. 160-168.
D.K.P. Tan, H. Sun, Y. Lu, M. Lesturgie and H.L. Chan, "Passive radar using Global System for Mobile communication signal: theory, implementation and measurements", IEE Proc.-Radar Sonar Navig., vol. 152, No. 3, Jun. 2005, pp. 116-123.
H.D. Griffiths, C.J. Baker, J. Baubert, N. Kitchen and M. Treagust, "Bistatic Radar Using Satellite-Borne Illuminators", The Institution of Electrical Engineers, IEE, 2002, pp. 1-5.

(Continued)

*Primary Examiner* — Bernarr E Gregory
(74) *Attorney, Agent, or Firm* — Sheridan Ross P.C.

(57) ABSTRACT

A passive proximity detection system and method are provided. A transmitted signal, such as a communication signal, is sampled and placed in memory. A version of the transmitted signal, reflected by a target in the vicinity of the transmitting antenna, is sampled and compared to the stored reference sample. Correlation between the reference and reflected samples indicates the presence of a target in the vicinity of the transmitting antenna. Processing of the signals can include frequency shifts to account for Doppler shifts in the reflected energy as a result of a non-zero relative radial velocity of the target. Multiple antennas for receiving reflected energy can be provided to enhance the coverage area of the system, and/or to provide information regarding the relative location of a target. In addition, signals from multiple transmitting antennas can be used as sources of energy for probing the vicinity of those antennas for targets.

21 Claims, 12 Drawing Sheets

OTHER PUBLICATIONS

P.E. Howland PhD MEng CEng MIEE, "Target tracking using television-based bistatic radar", IEE Proc.Radar, Sonar Navig., vol. 146, No. 3, Jun. 1999, pp. 166-174.

Dave H. Hilland, Gary S. Phipps, Curt M. Jingle and Gary Newton, "Satellite Threat Warning and Attack Reporting", IEEE, Document No. 0-7803-4311-5/98, 1998, pp. 207-217.

H.D. Griffiths, A.J. Garnett, C.J. Baker and S. Keaveney, "Bistatic Radar Using Satellite-Borne Illuminators of Opportunity", University College London, British Crown, 1992, pp. 276-279.

Lisa M. Ehrman and Aaron D. Lanterman, "Automated Target Recognition Using Passive Radar and Coordinated Flight Models", Center for Signal and Image Processing School of Electrical and Computer Engineering, pp. 1-12.

* cited by examiner

PASSIVE PROXIMITY SENSOR METHOD AND APPARATUS

FIELD

The disclosed invention is directed to the detection of a target in the proximity of a transmitting device. More particularly, the disclosed invention is directed to detecting the presence of a nearby object using radiation associated with a communication signal.

BACKGROUND

Satellites have become an important platform for supporting long distance communications, and for gathering environmental, atmospheric and intelligence data. In many instances, communications satellites and satellites for collecting environmental or intelligence information incorporate radio frequency downlink antenna systems.

As the importance of satellites has grown, so has the importance of protecting satellites from damage due to collisions with other satellites, space junk, and projectiles. In addition, it is desirable to detect potential monitoring, for example by other satellites in the vicinity of a satellite to be protected.

In order to provide situational awareness with respect to satellites, systems have been developed that utilize active radar systems. Such systems can be space based or ground based. Space based systems, for example systems deployed as part of a vehicle for which situational awareness is to be provided, must be carefully integrated, to avoid interfering with the functions of the satellite's primary payload. In addition, active systems present a significant drain on the satellite's power supplies. Active radio frequency systems also emit energy that can facilitate unwanted detection of the associated satellite. Ground based systems are necessarily remote from the satellite or satellites for which situational awareness is to be provided. In addition, ground based systems must be extremely powerful, and are difficult and expensive to implement and maintain. Other systems for providing situational awareness have operated at optical wavelengths. Optical systems deployed in the vicinity of a satellite to be protected often have difficulty in determining the range of detected targets. Optical systems that are ground based require expensive and heavy systems for collecting and focusing light, and are expensive to deploy.

In addition, passive radar systems that utilize a receiving antenna at a different location from the transmitting antenna have been demonstrated. In a typical scenario, such systems make use of a broadcast transmission, such as a television or global system for mobile communication (GSM) signal, to provide a radar system that is virtually undetectable to surveillance radars. However, because the receiver in such systems is not at the same location as the transmitter, received signals require disambiguation in order to provide range information. In addition, the broadcast signals that have been proposed for use as a probing signal contain repetitive structures that result in auto-correlation at many different time offsets. As a result, obtaining reliable range information using such systems has been difficult. Moreover, because such systems presuppose a non-cooperative transmitter, use of such systems in association with a mobile platform is not feasible.

SUMMARY

Embodiments of the present invention are directed to solving these and other problems and disadvantages of the prior art. In accordance with embodiments of the present invention, a passive proximity detection system (PPDS) is provided that can be deployed on or in association with a satellite or other vehicle that also carries a transmitting antenna that has a primary function related to transmitting a communication or navigation signal. The passive proximity detection system generally includes a receiving antenna and processing electronics that are capable of correlating a signal received by the receiving antenna with a communication signal transmitted by a downlink or other transmitting antenna deployed on or near the satellite carrying the PPDS. In particular, the PPDS and the transmitting antenna are in a mutually cooperative relationship, and are co-located. Accordingly, the co-location of and cooperation between the PPDS system and the transmitting antenna allows a target in the vicinity of the satellite to be detected by receiving a reflection of the communication signal transmitted by the communication antenna at the passive proximity detection system receive antenna. A signal indicating the presence of the target can then be provided to a control authority that is also on the vehicle carrying the PPDS and the transmitting antenna, or another nearby vehicle, and/or that is remote from the vehicle.

In accordance with embodiments of the present invention, multiple PPDS receive antennas can be included in the proximity detection system to provide the ability to detect targets at any point around the satellite. In addition, a proximity detection system in accordance with embodiments of the present invention can operate in connection with multiple transmitting antennas.

In accordance with embodiments of the present invention, the passive proximity detection system operates by storing a sample of the communication signal transmitted by the transmitting communication antenna. The signal sample is stored in memory as a reference sample sequence. The stored sample is then compared to a signal received by the PPDS receive antenna comprising a received signal sequence on a sliding basis. Successful correlation of the received signal to the sampled and stored transmitted signal indicates the presence of a target in the vicinity of the satellite. By determining the period of delay between the time at which the communication signal was originally transmitted and the time at which a correlated signal is received, information regarding the range to a detected target can be determined.

Embodiments of the present invention additionally provide information regarding the bearing to a detected target. For instance, the bearing to a detected target will generally be within the coverage area of a PPDS receive antenna. Such an area may be more narrowly defined where the presence of a target is detected by multiple PPDS receive antennas having overlapping coverage areas. In accordance with still other embodiments of the present invention, triangulation using multiple PPDS receive antennas may be performed to determine a relative location of a detected target. As can be appreciated by one of skill in the art, where at least two PPDS receive antennas see the same reflection from a target, an angle in one dimension relative to the passive proximity detection system can be obtained. If three PPDS receive antennas see a reflection from the same target, the relative angle to that target can be obtained in two dimensions. In accordance with still other embodiments of the present invention, a PPDS receive antenna may comprise an array antenna, which can enable direction finding by one of many direction finding algorithms or techniques known to those skilled in the art.

Embodiments of the present invention may also shift the received signal in frequency prior to attempting correlation with the reference signal segment. Moreover, multiple frequency shifts of different amounts may be performed. By matching one of the frequency shifted versions of the received signal to the stored sample signal, information regarding the amount of any Doppler shift imparted when the transmitted signal was reflected from the target can be obtained, and from that information, the radial velocity of the target relative to the PPDS sensor can be determined. In accordance with embodiments of the present invention, the shift of the received signal in frequency is performed by transforming the received signal segment waveform into the frequency domain, and performing a circular shift of the resulting signal spectrum sequence. In accordance with other embodiments of the present invention, the frequency shift is determined digitally.

In accordance with embodiments of the present invention, the sample of the communication signal transmitted by the transmitting antenna is obtained as a direct path signal received at a parasitic receive antenna element. Moreover, in accordance with embodiments of the present invention, this parasitic element may comprise a PPDS receive antenna that is also used to receive signals reflected from a target. In accordance with other embodiments of the present invention, the sample of the transmitted communication signal is obtained through a wire line connection to the communication signal transmitter. In connection with the processing of reference and reflected signals, embodiments of the present invention may down-convert those signals by mixing them with a signal from a local oscillator. Moreover, the local oscillator signal may be obtained from the same local oscillator used to generate the communication signal's carrier frequency. The comparison of sampled and reflected signals may be performed in the analog or digital domains.

Additional features and advantages of embodiments of the present invention will become more readily apparent from the following description, particularly when taken together with the accompanying drawings.

DETAILED DESCRIPTION

Figure 1:
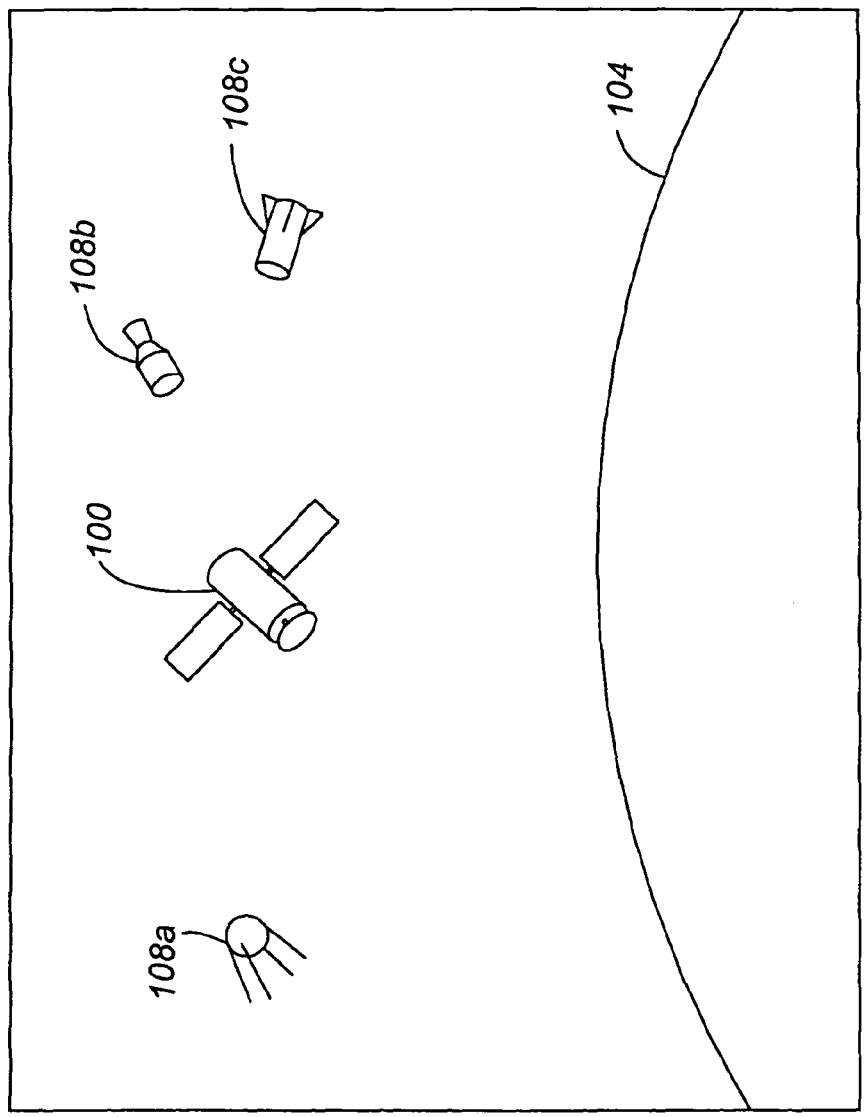
FIG. 1 depicts a satellite in orbit and targets in the vicinity of that satellite.

FIG. 1 depicts a satellite 100 associated with a passive proximity detection system (PPDS) in accordance with embodiments of the present invention, in orbit about a planetary body 104, such as the Earth. In the vicinity of the satellite 100 are a plurality of targets 108. These targets 108 may include other satellites 108a, missiles or other projectiles 108b, and debris or space junk, such as spent rocket boosters 108c. Although particular examples of targets 108 are depicted, it should be appreciated that embodiments of the present invention are not necessarily limited to the detection of targets 108 of any particular type or class. Although certain examples provided herein discuss a PPDS and transmitting antenna that are carried by the same satellite 100, embodiments of the present invention are not limited to use on satellites. For instance, a PPDS and transmitting antenna can be associated with any platform or vehicle in or on which a PPDS as described herein can be placed in a monostatic relationship (i.e., can be co-located or mounted to a common vehicle or platform) with an antenna transmitting a communication or information signal.

Figure 2:
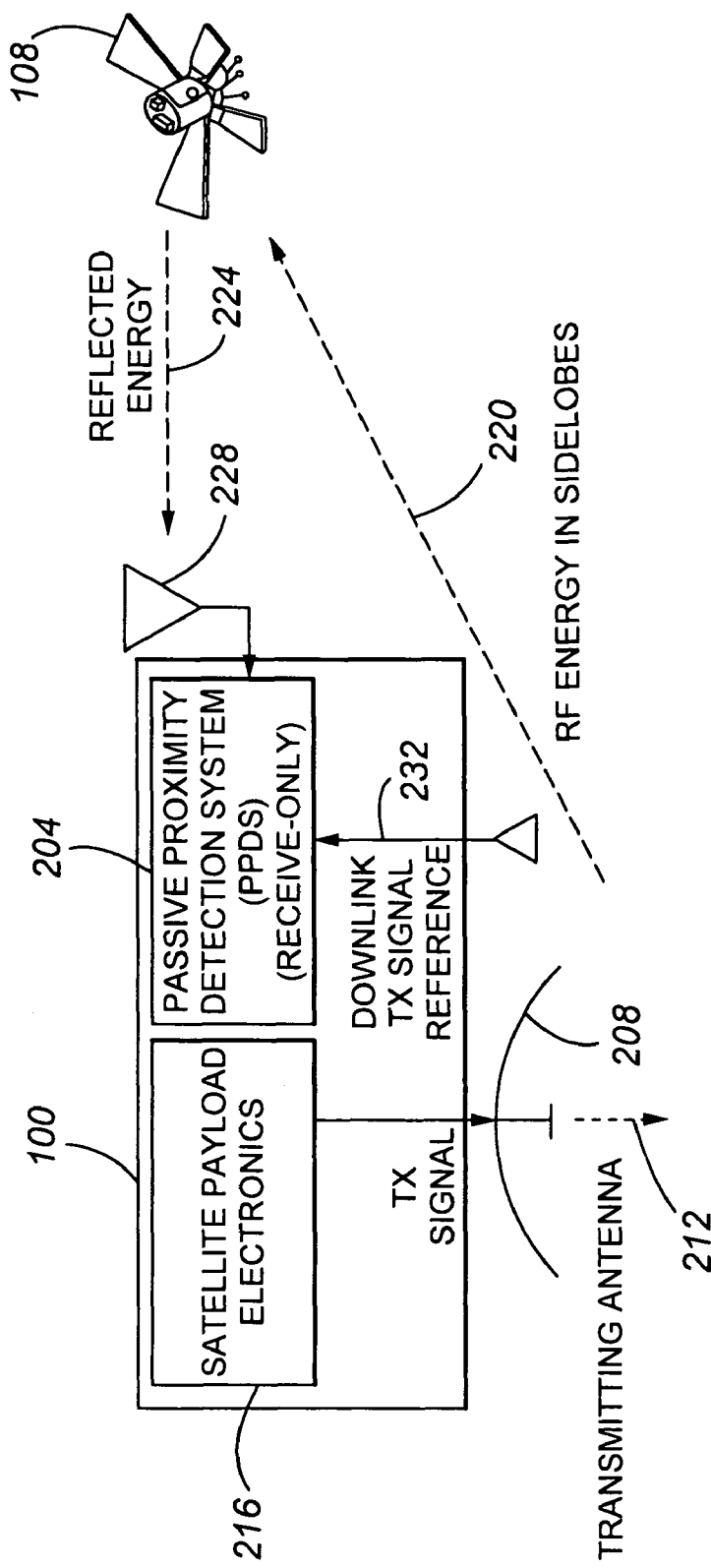
FIG. 2 is a block diagram depicting components of a satellite including a passive proximity detection system in accordance with embodiments of the present invention, with a target in the vicinity of that satellite.

FIG. 2 shows a satellite 100 associated with a passive proximity detection system 204, and illustrates aspects of the operation of the passive proximity detection system 204 in relation to a target 108 in the vicinity of the satellite 100. As shown, the satellite 100 is associated with a satellite or vehicle payload 214 that generally comprises a communication signal transmitter that operates in association with a transmitting antenna 208 to transmit a communication signal or other signal 212 (hereinafter referred to as the communication signal 212). The satellite payload 214 may further include satellite payload electronics 216 that operate to provide the communication signal 212 to the transmitting antenna 208. As an example, the transmitted communication signal 212 may comprise a relayed communication of data, such as data being transmitted from a ground or space based transmitter to a ground or space based receiver via the satellite 100. As another example, the transmitted communication signal 212 may comprise a signal containing data collected by other instruments associated with the satellite 100. As yet another example, the transmitted communication signal may comprise Global Positioning System (GPS) satellite navigation messages.

As can be appreciated by one of skill in the art, a radio frequency transmission from a transmitting antenna 208 is typically associated with a beam pattern featuring a number of lobes. With respect to a directional antenna, it is generally desirable to focus the great majority of the transmitted energy into a main beam, while limiting the energy carried by side lobes as much as possible. However, any practical antenna design will exhibit at least some leakage in the form of side lobes. As will be appreciated by one of skill in the art after consideration of the present disclosure, the inventors of the present invention have used these characteristics of the antenna beam as a source of energy with which the vicinity of the transmitting antenna 208 can be probed in order to detect the presence of targets 108. Moreover, because embodiments of the present invention provide a PPDS 204 that is in a cooperative relationship with the transmitting antenna 208, the characteristics of the transmitted signal are well known to the PPDS. These characteristics of the transmitted signal that are known to the PPDS 204 can include the carrier frequency, antenna beam pattern, timing information, and a sample of the transmitted signal or signal to be transmitted that is obtained without any appreciable delay. With continued reference to FIG. 2, radio frequency energy transmitted by the transmitting antenna 208 included in a side lobe 220 may be aligned such that it intercepts a target 108. Moreover, at least some of the energy in the side lobe 220 may be reflected from the target 108 as reflected energy 224. Alternatively or in addition, at least some of the energy in a main beam may be reflected from the target 108 as reflected energy. That reflected energy 224 is received at a PPDS receive antenna 228. In order to characterize the reflected energy 224 received at the PPDS receive antenna 228, that received energy is correlated to a reference signal 232 taken from the transmitted signal 212.

Figure 3:
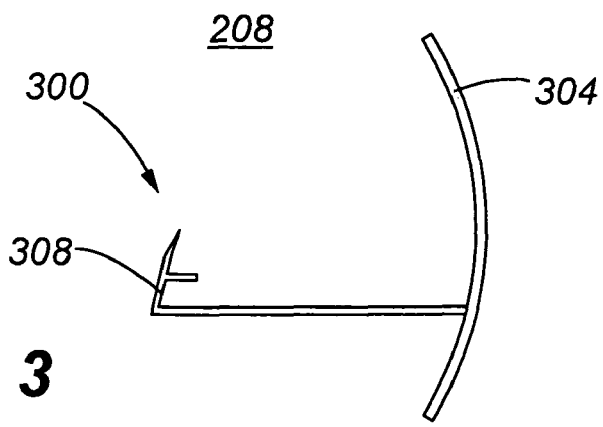
FIG. 3 depicts an exemplary communication signal transmission system that may be associated with a passive proximity detection system in accordance with embodiments of the present invention.
Figure 4:
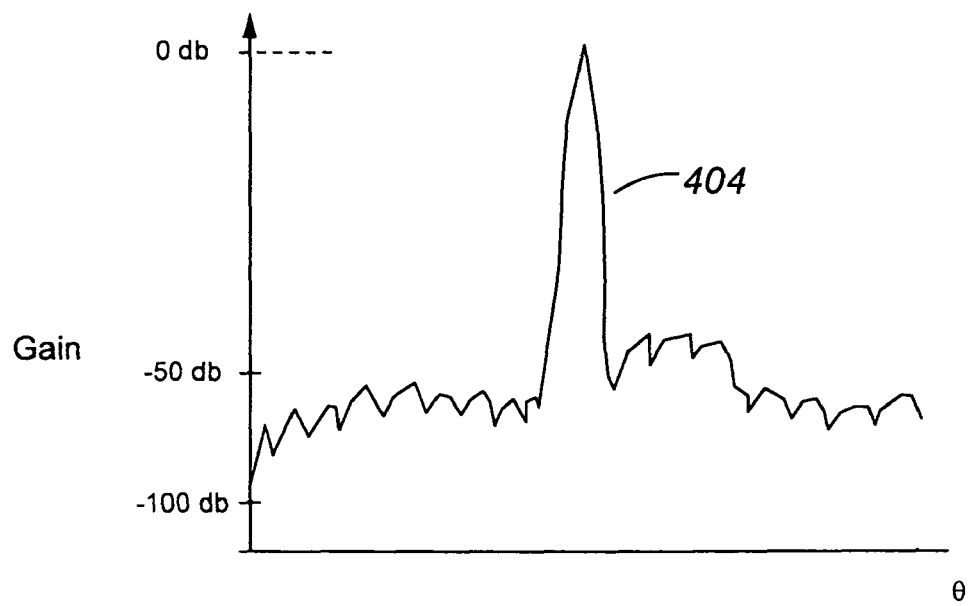
FIG. 4 depicts the gain of the exemplary communication signal transmission system illustrated in FIG. 3.

FIG. 3 depicts portions of a satellite payload 214 comprising a communication signal transmission system 300 that includes an antenna 208 comprising a reflector 304 fed by a horn 308. The antenna pattern 404 of the example transmitting antenna 208, operating at 20 GHz, is shown in FIG. 4. The pattern 404 shows features typical of an offset feed reflector transmitting antenna system such as transmitting antenna system 300, including side lobes, substantial spillover over the top surface (visible for θ from about 70-90 degrees), and relatively small reflection back towards the feed (θ less than zero). The radiated power outside of the main lobe is asymmetric and variable. However, as can be appreciated by one of skill in the art, a satellite 100 may include multiple transmitting antennas 208. Therefore, a reasonable degree of omnidirectionality is often present, allowing proximity detection at all or most points about the satellite 100 associated with the passive proximity detection system 204.

Figure 5A:
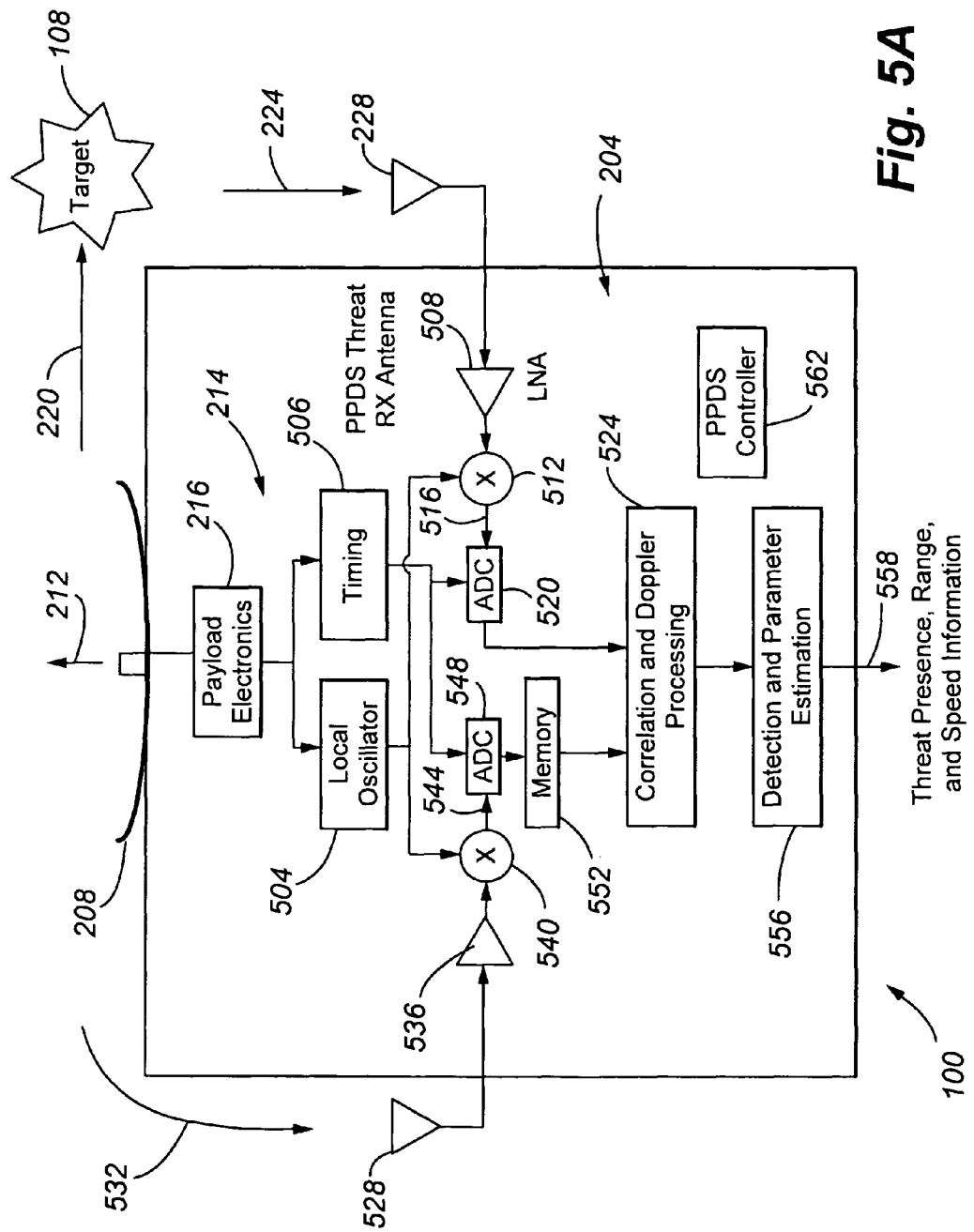
FIG. 5A depicts components of a satellite incorporating a passive proximity detection system in accordance with embodiments of the present invention.

FIG. 5A depicts a satellite 100 incorporating a satellite payload 214 and a passive proximity detection system 204 in accordance with embodiments of the present invention. As shown, the satellite payload 214 generally includes the transmitting antenna 208, payload electronics 216, a local oscillator 504, and a timing circuit 506. In general, the payload electronics 216 determine the content and/or form of the communication signal 212 transmitted by the transmitting antenna 208. The local oscillator 504 provides the carrier frequency for the communication information transmitted as part of the communication signal 212. The timing circuit 506 provides a time/frequency reference for coordinating operation of the satellite payload 214 with the passive proximity detection system 204.

The passive proximity detection system 204 generally includes a PPDS receive antenna 228 that is operable to receive a time delayed and possibly frequency shifted version of the communication signal 212 emitted as part of the main or a side lobe 220 of the transmitting antenna 208 beam pattern that has been reflected off of a target 108 as reflected energy 224. The output from the PPDS receive antenna 228 may be connected to a reflected energy low noise amplifier 508, which operates to increase the amplitude of the signal received as reflected energy 224. The output from the reflected energy low noise amplifier 508 is provided to a reflected energy mixer 512, which down converts the amplified reflected energy signal 224 by mixing that signal with the carrier signal from the local oscillator 504. The carrier signal may be provided by a wireline connection between the local oscillator 504 and the reflected energy mixer 512. The result is an intermediate frequency or a complex envelope 516. An analog to digital converter 520 may be provided for converting the signal sample 516 to the digital domain. Timing information is provided to the analog to digital converter 520 by the timing circuit 506. This timing information may be provided by a wireline connection between the analog to digital converter and the timing circuit 506. The sample 516 of the reflected energy 224 is then provided to a cross correlation and signal processor 524 to complete the digital down conversion process. In accordance with embodiments of the present invention, the PPDS receive antenna 228 is a wide angle antenna. For example, the PPDS receive antenna 228 may comprise a patch antenna having a 120 degree receive angle.

A downlink sampling antenna 528 may also be provided. The downlink sampling antenna 528 receives a direct path sample 532 of the transmitted communication signal 212, for example by acting as a parasitic element placed within a side lobe of the transmitting antenna 208 beam. The sample 532 of the communication signal 212 is amplified by a reference low noise amplifier 536, and provided to a mixer 540. In the mixer 540, the amplified sample of the communication signal 212 is down converted to an intermediate frequency or complex envelope to provide a reference signal 544. An analog to digital converter 548 may be provided for converting the reference signal 544 to the digital domain. Timing information is provided to the analog to digital converter 548 by the timing circuit 506. The reference signal 544 is then stored in memory 552.

The cross correlation and signal processor 524 receives as inputs the digitized sample 516 of the reflected energy 224, and the digitized sample of the reference signal 544 stored in memory 552. The cross correlation and signal processor 524 then compares the sample 516 of the reflected energy 224 to the sample of the reference signal 544 on a sliding basis to look for correlations, as will be discussed in greater detail below. Information from the cross correlation and signal processor 524 is then provided to a detection and parameter estimation processor 556, which operates to provide output information 558 regarding the presence of a target in the vicinity of the satellite 100. Moreover, the information output by the detection and parameter estimation processor 556 can further include information regarding the range, relative location, and relative radial velocity of the target 108. Overall operation of the passive proximity detection system 204 may be controlled and/or coordinated by programming instructions executed by a PPDS controller 562.

Figure 5B:
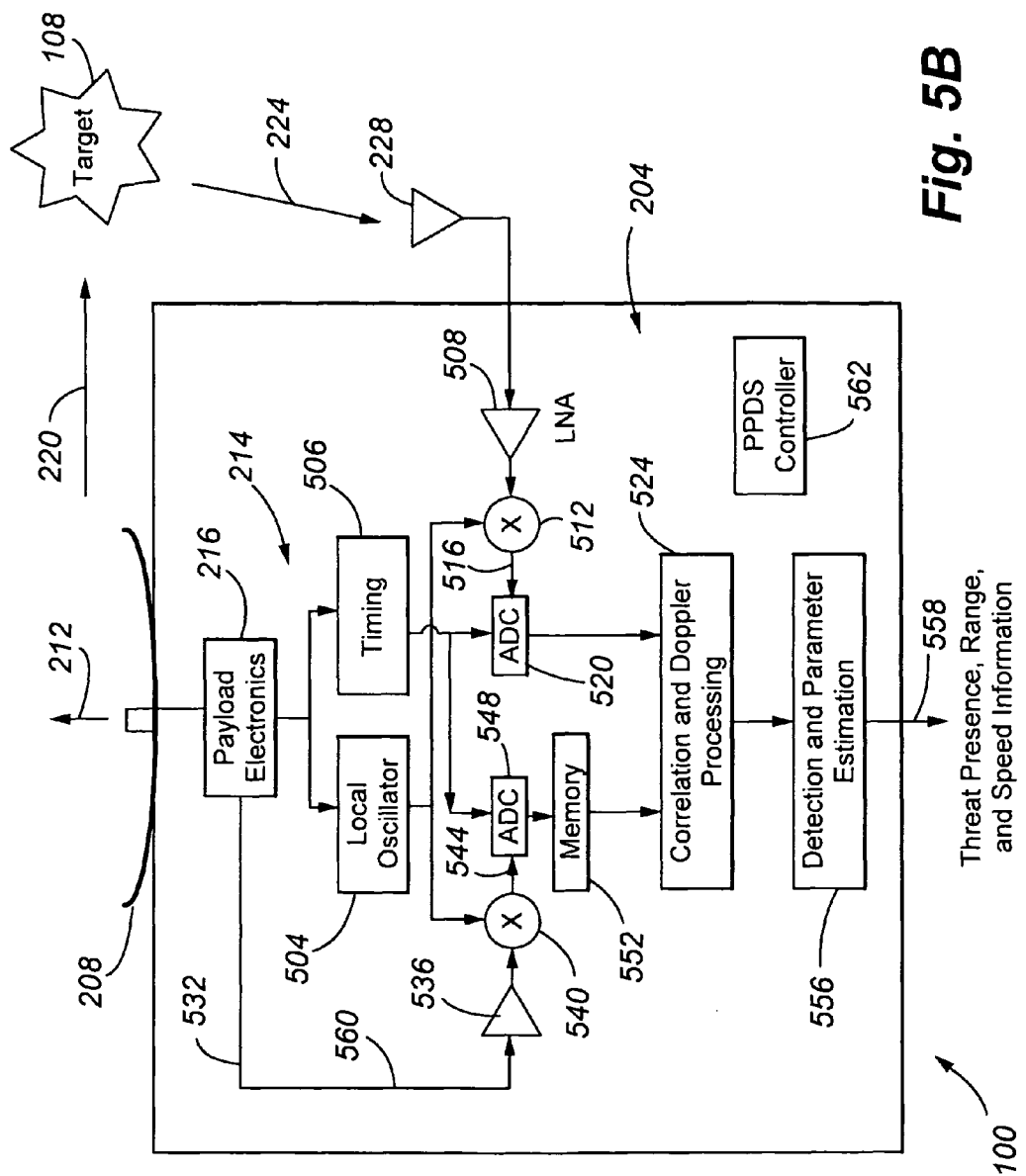
FIG. 5B depicts components of another satellite incorporating a passive proximity detection system in accordance with embodiments of the present invention.

With reference now to FIG. 5B, a satellite 100 incorporating a passive proximity detection system 204 in accordance with other embodiments of the present invention is illustrated. In this embodiment, a sample 532 of the transmitted communication signal 212 is provided from the payload electronics 216 to the passive proximity detection sensor 204 electronics directly via a transmission line 560. In the figure, the sample of the transmitted communication signal 212 is shown being provided by the transmission line 560 to a reference signal mixer 540 via a low noise amplifier 536. However, as can be appreciated by one of skill in the art, provided that the signal from the payload electronics 216 is of sufficient strength, the transmission line 560 may instead provide the sample of the transmitted communication signal 212 to the reference signal mixer 540 directly. Accordingly, the embodiment illustrated in FIG. 5B includes two wire line connections between components included as part of the passive proximity detection system 204 and components included as part of the satellite payload 214: the connection to the local oscillator 504, and the connection to the payload electronics via the communication signal transmission line 560. In accordance with at least some embodiments, a wire line connection may also be provided from the timing circuit 506 to components of the passive proximity detection system 204. Processing, cross-correlation, and detection operations may then be performed as in other embodiments of the present invention.

Figure 5C:
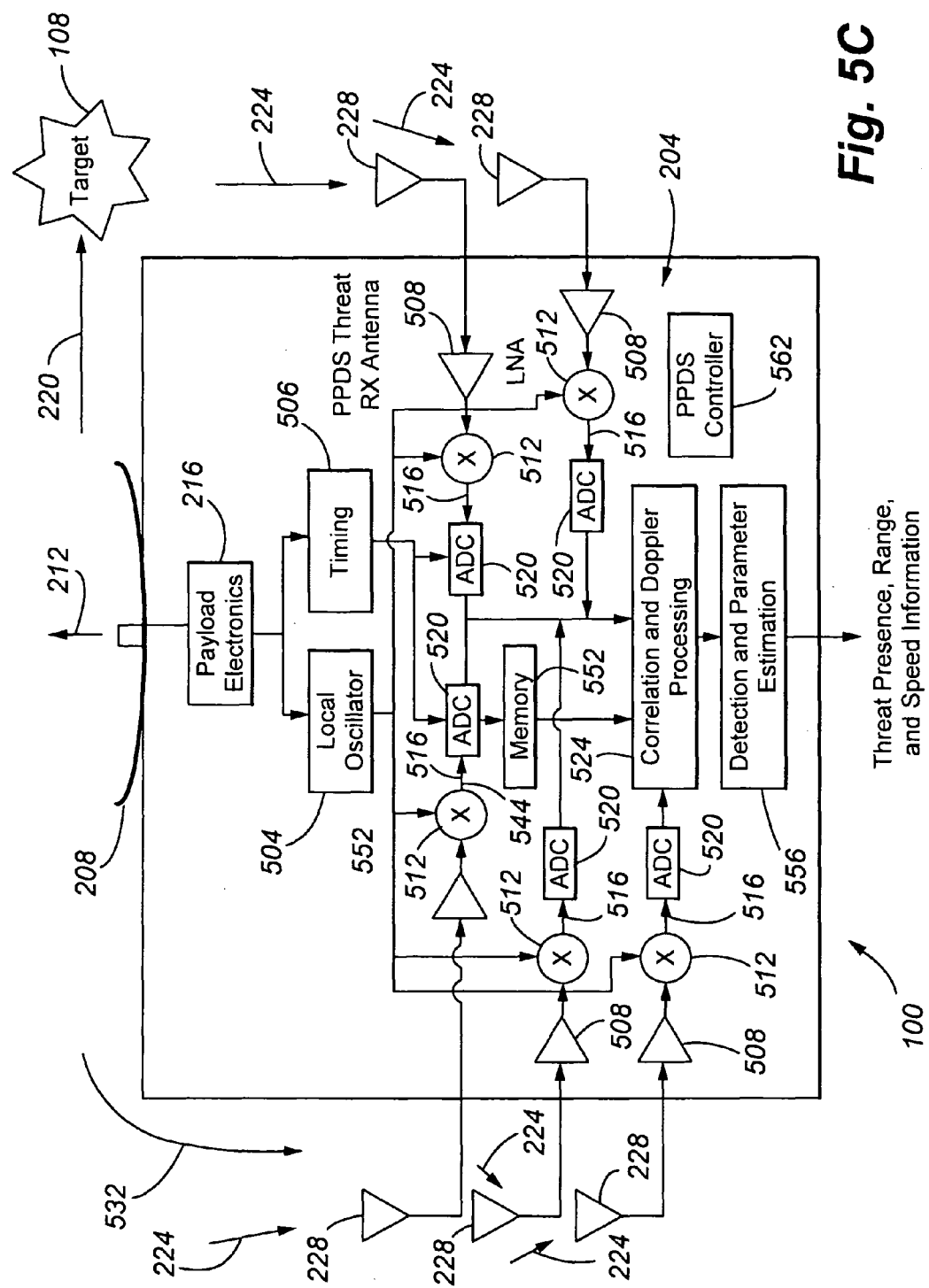
FIG. 5C depicts components of another satellite incorporating a passive proximity detection system in accordance with embodiments of the present invention.

With reference now to FIG. 5C, a satellite 100 incorporating a passive proximity detection system 204 in accordance with still other embodiments of the present invention is illustrated. In this embodiment, multiple PPDS receive antennas 228 are provided. In particular, a passive proximity detection system 204 having five PPDS receive antennas 228 is illustrated. As can be appreciated by one of skill in the art, where each of the PPDS receive antennas 228 provides 120 degrees of coverage, the inclusion of five such receive antennas 228 provides coverage in any direction about the satellite 100 with which the passive proximity detection system 204 is associated. As shown, each PPDS receive antenna 228 is associated with a mixer 512 to obtain a down converted sample 516, and an analog to digital converter 520 to convert the down converted sample to the digital domain. The analog to digital converters may all be provided with a timing signal, although for clarity the figure does not show a connection between all of the analog to digital converters 520 and the timing circuit 506. Each of the digitized samples can then be individually correlated to the reference sample in the cross-correlation and signal processor 524. Alternatively, a dedicated cross-correlation and signal processor 524 and/or dedicated detection and parameter estimation processor 556 could be provided in association with each PPDS receive antenna 228. According to such embodiments, less than all of the PPDS receive antennas 228 will typically receive a reflected signal 224 from a single target 108. Where multiple targets 108 are in a vicinity of the satellite 100, reflected signals 224 may be received at some or all of the PPDS receive antennas 228. Moreover, at least some PPDS receive antennas 228 may receive signals 224 reflected from more than one target 108 where multiple targets 108 are in the vicinity of the satellite 100. Accordingly, a correlation between a digitized sample 544 of the transmitted signal can be performed multiple times with respect to energy 224 reflected from one or more targets 108 that is received by one or more PPDS receive antennas 528.

The embodiment illustrated in FIG. 5C also uses a PPDS receive antenna 228 to obtain a sample of the transmitted communication signal 212. That is, because a PPDS receive antenna 228 will typically receive a direct path version 532 of the transmitted signal 212, as well as a version of that signal reflected from targets 108 within the beam pattern of the PPDS receive antenna 228, providing a separate sampling antenna 528 (as shown in FIG. 5A) or a transmission line 560 (as shown in FIG. 5B) is not necessary. Accordingly, a sample of a direct path signal 532 received by one of the PPDS receive antennas 228 may be placed in memory 552 for use as a reference.

Figure 5D:
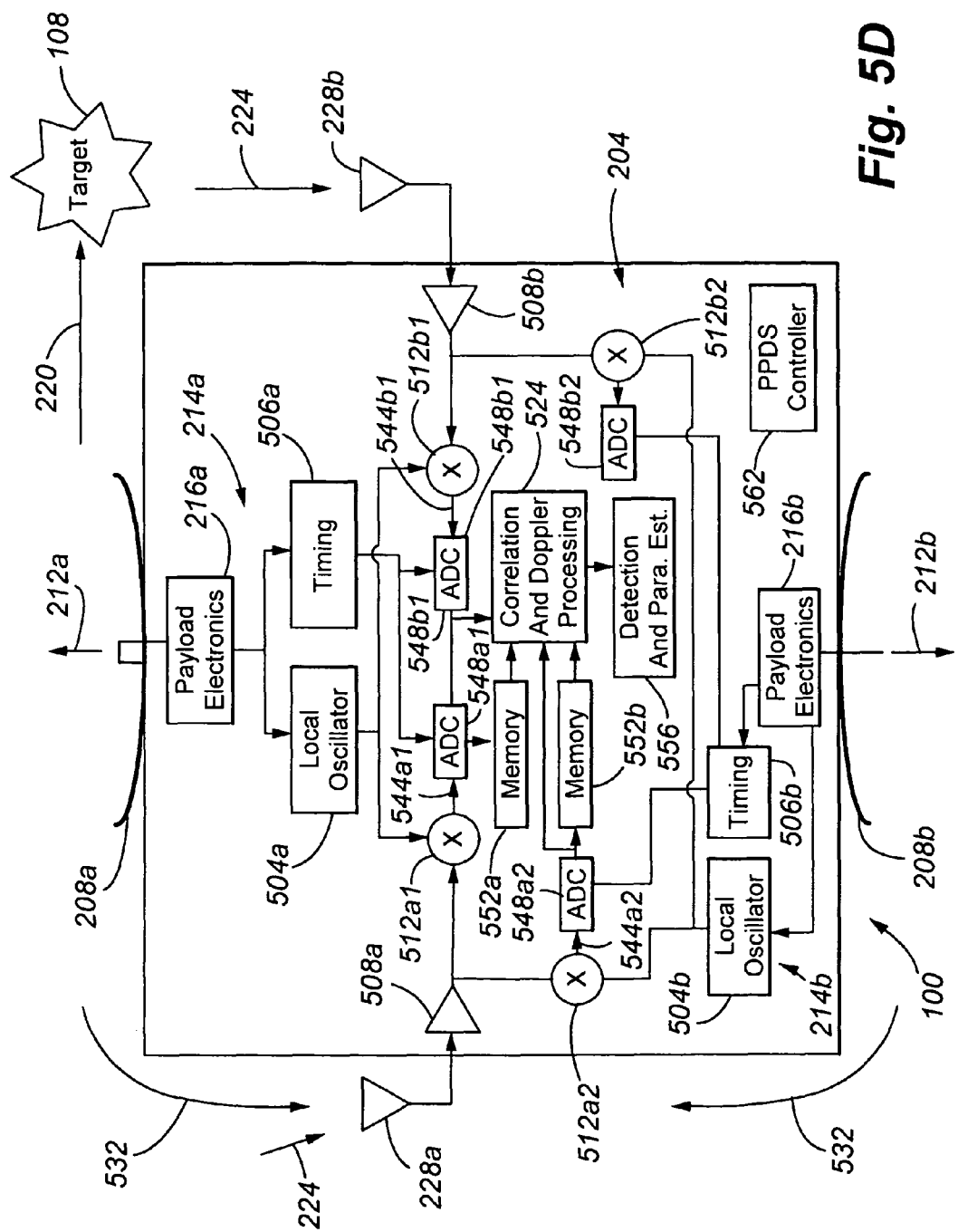
FIG. 5D depicts components of another satellite incorporating a passive proximity detection system in accordance with embodiments of the present invention.

FIG. 5D illustrates a satellite 100 incorporating a passive proximity detection system 204 in accordance with further embodiments of the present invention. In this embodiment, multiple transmitting antennas 208 and multiple PPDS receive antennas 228 are included. In particular, a first 208a transmitting antenna associated with first satellite payload 214a components, and a second transmitting antenna 208b associated with second satellite payload 214b components are provided. In addition, the illustrated embodiment includes a first PPDS receive antenna 228a and associated processing electronics, and a second PPDS receive antenna 228b and associated processing electronics. As can be appreciated by one of skill in the art, the PPDS receive antennas 228 are capable of receiving reflected signals 224 that are versions of signals 212a and/or 212b transmitted by either or both of the transmitting antennas 208 at any one point in time. Signals received by the PPDS receive antennas 228 are individually amplified in associated low noise amplifiers 508. The signal from the low noise amplifier 508a associated with the first PPDS receive antenna 228a is provided to a first mixer 512a1 for mixing with a local oscillator signal provided by the local oscillator 504a associated with the first payload 214a. The resulting demodulated signal 544a1 is then provided to a first analog to digital converter 548a1 that receives timing information from the timing circuit 506a included as part of the first satellite payload 514a. The first analog to digital converter 548a1 associated with the first PPDS receive antenna 228a provides an output comprising a first channel of the first PPDS receive antenna 228a to the cross correlation and signal processor 524, and also to a first memory 552a. As can be appreciated by one of skill in the art, the first memory 252a may be operative to store a sample of the communication signal 212a generated through operation of the first satellite payload 214a.

The signal from the first low noise amplifier 508a is also provided to a mixer 512a2 that receives a local oscillator signal from a local oscillator 504b associated with the second satellite payload 214b. The demodulated signal 544a2 obtained by mixing the sample of the signal received at the first PPDS receive antenna 228a and the signal from the local oscillator 504b is provided to an analog to digital converter 548a2 that receives timing information from a timing circuit 506b included as part of the second satellite payload 214b. The output from the analog to digital converter 548a2 comprises a second channel of the first PPDS receive antenna 228a that is provided to the cross correlation and signal processor 524, and also to a second memory 552b. The sample provided to memory 552b serves as a reference signal comprising a sample of the second communication signal 212b.

Signals received by the second PPDS receive antenna 228b are provided to a second low noise amplifier 508b. The output from the second low noise amplifier 508b is provided to a first mixer 512b1 that receives a local oscillator signal from the local oscillator 504a associated with the first payload 214a, and to a second mixer 512b2 that receives a local oscillator signal from the local oscillator 504b associated with the second payload 214b. The signal 544b1 resulting from the mixing of the reference signal from the first local oscillator 504a and the signal received by the second PPDS receive antenna 228b is provided to a first analog to digital converter 548b1. The analog to digital converter 548b1 is provided with timing information from the timing circuit 506a of the first payload 214a. The output from the analog to digital converter 548b1 comprises a first channel of the second PPDS receive antenna 228b, and is provided to the cross correlation and signal processor 524.

A portion of the output from the low noise amplifier 508b associated with the second PPDS receive antenna 228b comprising a second channel of the second PPDS receive antenna 228b is mixed with a signal from the local oscillator 504b associated with the second payload 214b in a mixer 512b2, to create a demodulated signal 544b2 comprising a second channel of the second PPDS receive antenna 528b. That signal 544b2 is then provided to an analog to digital converter 548b2 that receives timing information from the timing circuit 506b of the second payload 214b. The output from the analog to digital converter 548b2 of the second PPDS receive antenna 528b is then provided to the cross correlation and signal processor 524.

As can be appreciated from the figure and the foregoing description, the embodiment illustrated in FIG. 5D utilizes a first PPDS receive antenna 228a as a parasitic receiver in order to obtain a direct path sample of both the first communication signal 212a and the second communication signal 212b. Moreover, it should be appreciated that samples of both communication signals 212a and 212b can be obtained simultaneously, for example when both the first communication signal 212a and the second communication signal 212b are being transmitted simultaneously. In addition, the first PPDS receive antenna 228a is capable of collecting a reflected signal 224 comprising energy from a main or side lobe of the first 208a and/or second 208b transmitting antennas that has been reflected by a target 108 in the vicinity of the satellite 100.

Figure 5E:
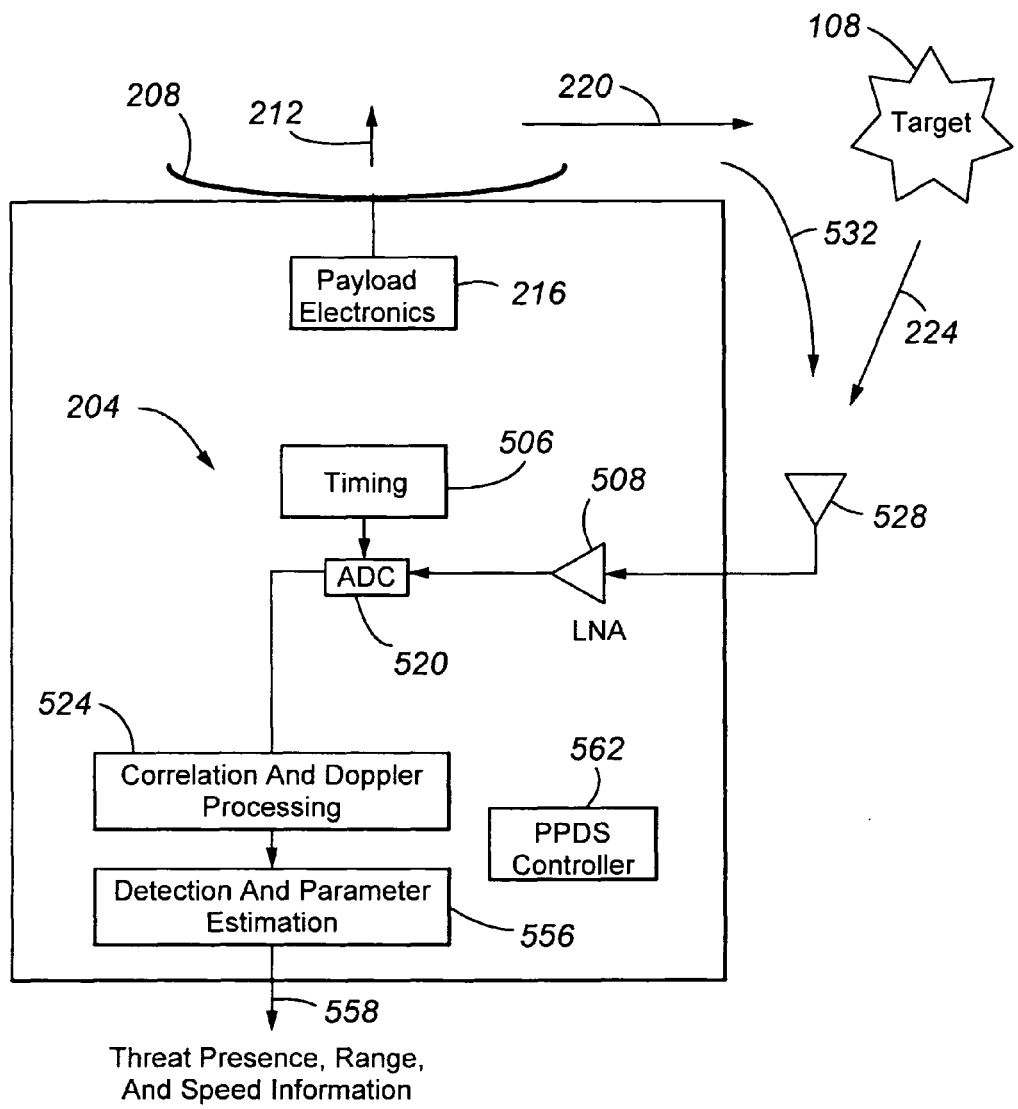
FIG. 5E depicts components of another satellite incorporating a passive proximity detection system in accordance with embodiments of the present invention.

FIG. 5E illustrates a satellite 100 incorporating a passive proximity detection system 204 in accordance with other embodiments of the present invention. In this embodiment, there is no wireline connection between the payload electronics 216 and the passive proximity detection system 204. In addition, the timing circuit 506 is provided as part of the passive proximity detection system 204. Also, the passive proximity detection system 204 of this embodiment does not include a local oscillator or a connection to a local oscillator. Instead, the analog to digital converter 520 operates at radio frequencies. In addition, both the reflected energy 224 and a sample of the communication signal 532 are received at the same PPDS receive antenna 228, and passed through a common low noise amplifier 508 to the analog to digital converter 520. Separation of the sample 532 from the reflected signal 224 can then be performed in the signal processor 524. Accordingly, the embodiment illustrated in FIG. 5E is particularly suited to providing a passive proximity detection system 204 that can easily be added to a satellite, without requiring integration between the passive proximity detection system 204 and the payload 216 of the satellite 100.

Figure 5F:
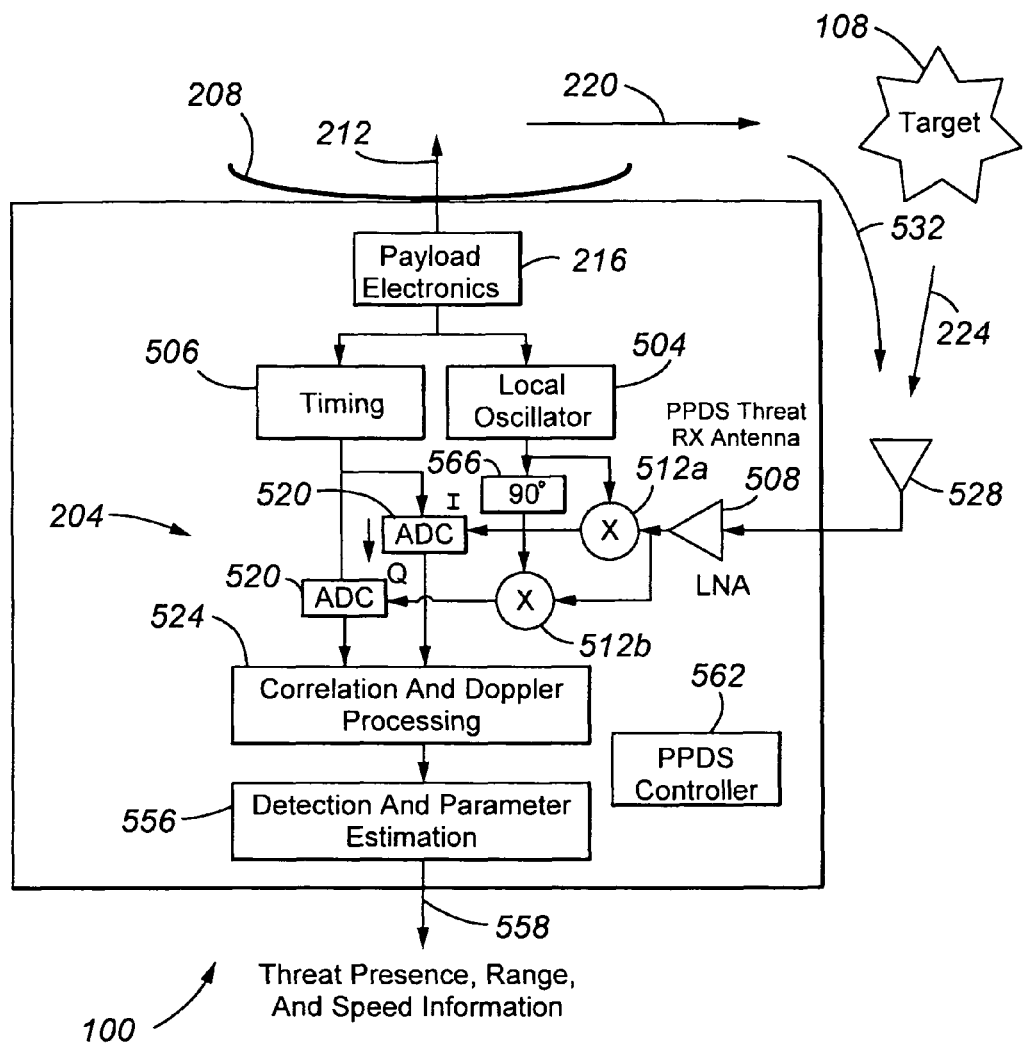
FIG. 5F depicts components of another satellite incorporating a passive proximity detection system in accordance with embodiments of the present invention.

With reference now to FIG. 5F, a passive proximity detection system 204 in accordance with embodiments of the present invention that use analog quadrature detection is illustrated. In particular, the signals 224, 532 received at the PPDS receive antenna 528 are amplified in a low noise amplifier 508, and that signal is made available to parallel mixers 512. A first mixer 512a receives a signal from the local oscillator 504 directly, and thus provides an in-phase demodulated signal. The second mixer 512b receives a signal from the local oscillator 504 that has been shifted by 90° in a phase shifter 566, and thus provides a quadrature demodulated signal. The in-phase signal is sent to an analog to digital converter 520 for digitization, and from there is provided to the signal processor 524. Similarly, the quadrature signal is provided to an analog to digital converter 520 for digitization, and is then provided to the signal processor 524. Although not shown in the figure, memory may also be provided separately or as part of the signal processor 524 for recovering a reference signal. Accordingly, embodiments of the present invention may incorporate analog down conversion, in addition or as an alternative to digital down conversion in quadrature.

Figure 6:
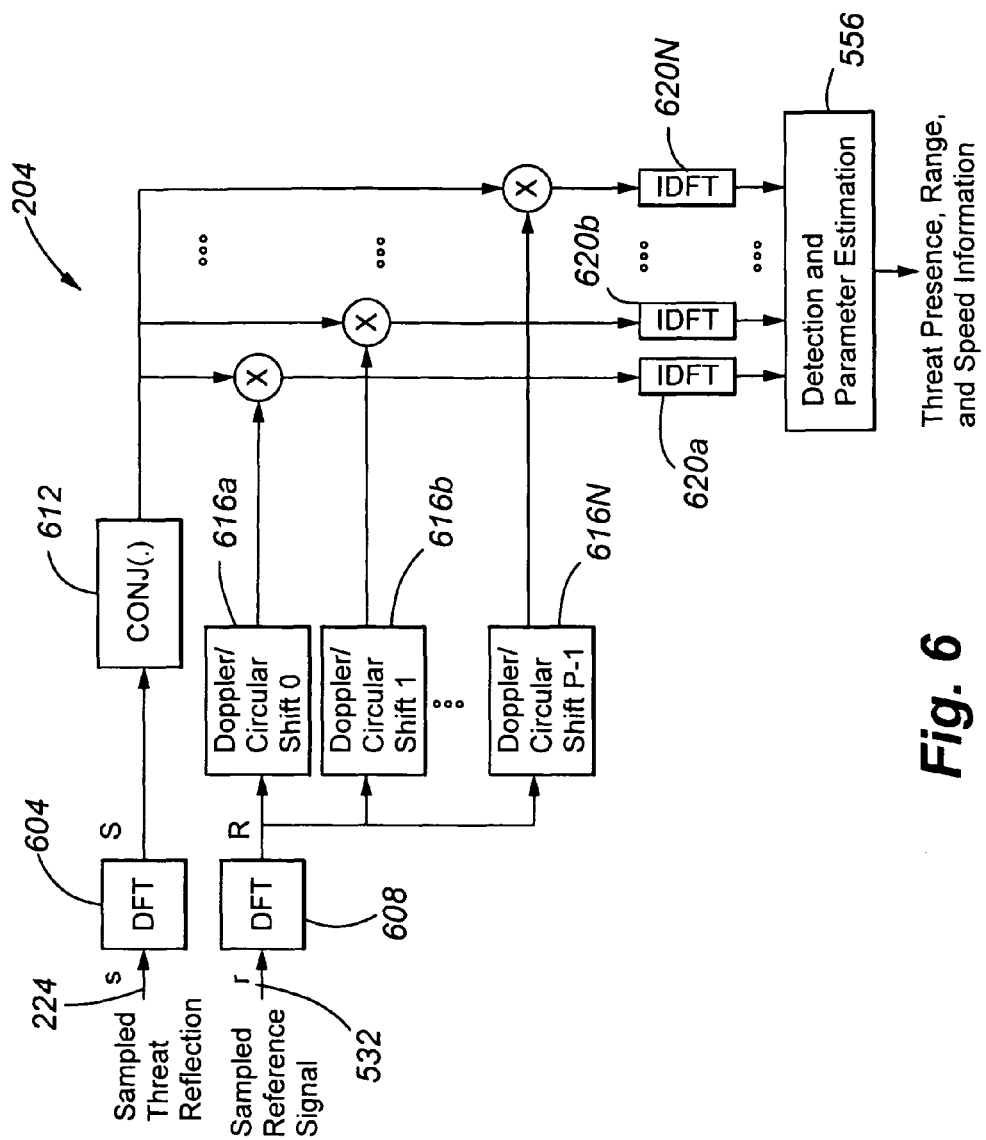
FIG. 6 depicts components and functions of a passive proximity detection system in accordance with embodiments of the present invention.

FIG. 6 depicts other components and functions of a passive proximity detection system 204 in accordance with embodiments of the present invention. In general, reflected energy 224, which may comprise a sampled reflection from a target 108 of energy in a side lobe 220 of a communication signal 212 is received and a discrete Fourier transform is performed 604. In parallel, a sampled reference signal 532 is received and is also transformed to the frequency domain using a discrete Fourier transform 608. As discussed in connection with FIGS. 5A-5D, the sampled reference signal 532 may be stored in memory 552.

A complex conjugate of the transformed threat reflection is calculated 612. In addition, circular shifts of different amounts are performed on the transformed reference signal 532 by Doppler/circular shift functions 616a to 616n. Each circularly shifted version of the sampled reference signal 532 is combined with a copy of the complex conjugate of the sampled target reflection 224, and an inverse discrete Fourier transform (IDFT) 620a to 620n comprising a cross correlation sequence corresponding to different Doppler shifts in the received signal 224 is obtained. The output data therefore form a two-dimensional output array. Accordingly, for a set of differently shifted reference samples delayed by a period of time equal to the travel time to and from a target 108 from which the signal 224 is reflected, a certain Doppler shift will appear as a peak in the array position corresponding to that range and Doppler shift. The identification of the range and relative velocity of the target 108 thus obtained is determined by the detection and parameter estimation processor 556. In accordance with further embodiments of the present invention, Doppler shift detection and measurement is performed by digital signal processing.

Figure 7:
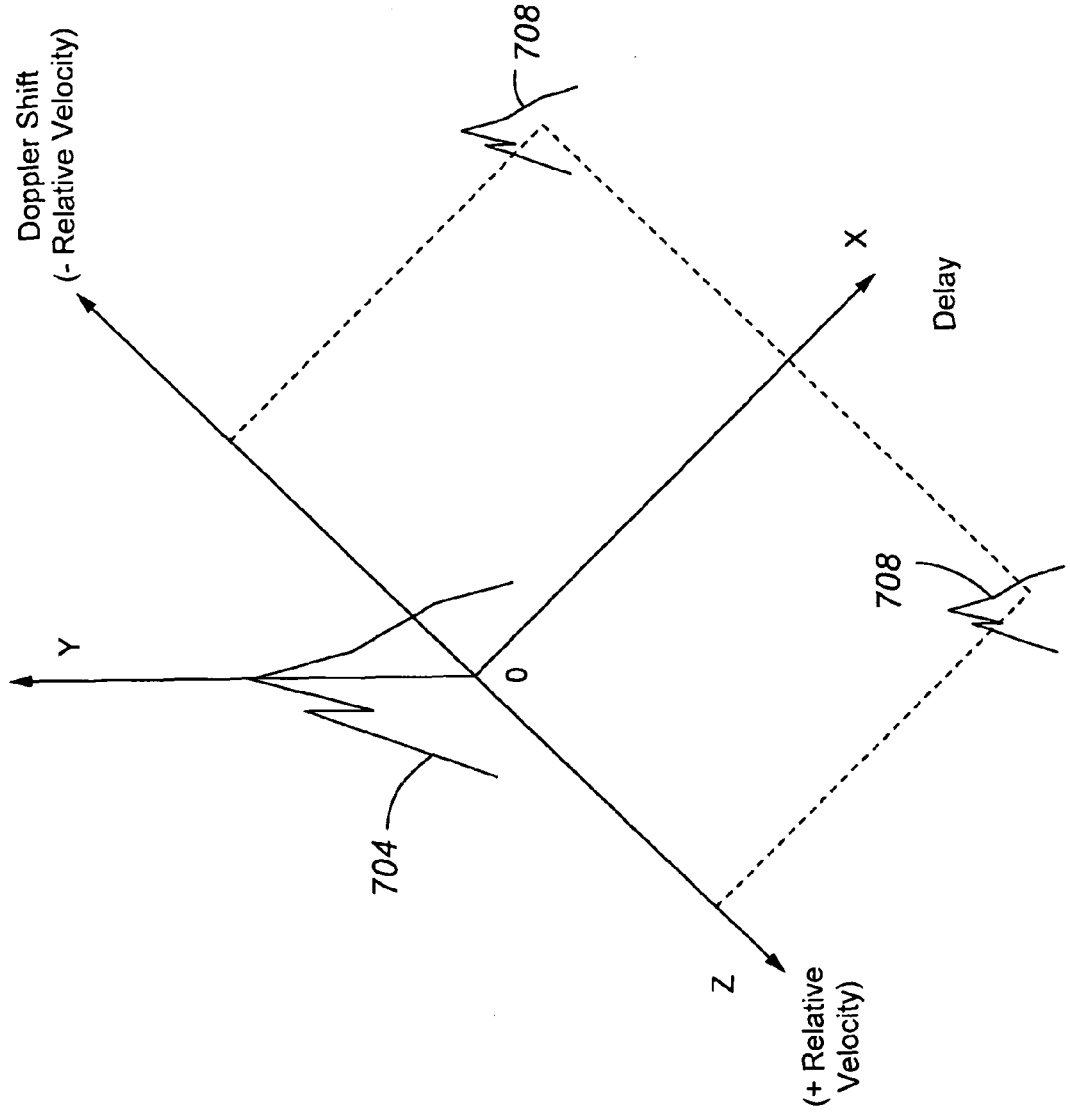
FIG. 7 depicts the relationship of a transmitted signal to a reflected signal used for passive proximity detection in accordance with embodiments of the present invention.

With reference now to FIG. 7, the relationship of a transmitted signal to a reflected signal in accordance with embodiments of the present invention is illustrated. In particular, a waveform 704 corresponding to a baseband version or complex envelope of a sample communication signal 532 is generally centered about an axis corresponding to zero delay and zero Doppler shift. The x-axis represents the period of delay from transmission of the transmitted signal 212, shown in the figure as sample 704, and the receipt of reflected energy 224, shown by received signal samples 708. In general, the amplitude of a received reflected signal segment 708 will be less than the amplitude of the sample of the transmitted signal 704. As can be appreciated by one of skill in the art, the time period of the delay corresponds to the range of the reflecting target 108 from the satellite 100. The distance of the reflected signal segment 708 from the origin along the Z axis corresponds to the Doppler shift imparted to the reflected waveform segment 708 as compared to the transmitted signal segment 704. As can also be appreciated by one of skill in the art, the Doppler shift corresponds to the relative radial velocity of the reflecting target 108 to the satellite 100.

A passive proximity detection system 204 in accordance with embodiments of the present invention can be used in connection with a wide variety of satellites, employing different modulation schemes. In general, the transmitted signal 212 is sampled at radio frequency, and a range of frequencies or a block of continuous channels is down converted to baseband, sampled, and stored in memory. In connection with employing the transmitted signal 212 to detect targets 108 in the vicinity of a satellite 100, there is no need to demodulate the symbols or information encoded in that transmitted signal 212. Accordingly, embodiments of the present invention are operable in connection with a wide variety of transmitted signals 212, including spread spectrum and radio frequency downlink communications. Moreover, a transmitted signal may comprise a plurality of communication channels or streams that are transmitted simultaneously by the payload 214 that is co-located with the PPDS 204. Where a plurality of communication streams are transmitted, correlations between a reference sample sequence and a received sample sequence can be improved as compared to systems in which a single stream is transmitted, particularly where that single stream includes repetitive information, as the multiple streams are typically random with respect to one another. Signals reflected from a target 108 have the same waveform as the transmitted signal 212. Accordingly, detection is accomplished by correlation of the reflected signal 224 with the sample 532 of the transmitted signal 212, without regard to the content of the waveforms. Moreover, because the reflected signal 224 is a delayed version of the reference waveform 532, the correlation is actually an autocorrelation. The correlator provided by the cross correlation and signal processor 524 produces a sharp output, because transmitted signals 212 comprising communication waveforms typically have good correlation properties, especially over wide bandwidths. In addition, the use of communication waveforms as a transmitted signal 212 allows for extended integration time, while retaining sharp time resolution. Moreover, because a passive proximity detection system 204 does not require the transmission of any probing beam, other than the transmitted signal 208 of the satellite payload 214, there is no potential for interference with the transmitted signal 208.

Generally stated, a passive proximity detection system 204 in accordance with embodiments of the present invention detects the presence of an echo signal, and is capable of estimating the range and speed of the target 108. The roundtrip travel time of an electromagnetic signal to a target at range D is: $\Delta t = 2d/c$, where c is the speed of light. Where the transmitted waveform is sampled at a rate of $1/T_s$ for a sequence of reference samples $r_m$, for m=1 . . . M that is long enough to encompass the largest round trip delay to the target that is expected, the number of samples required is given by:

$$M = \frac{2d_{max}}{cT_s}.$$

The cross correlation of the reference and signal sequences is given by:

$$y_n = \sum_m r_m^* s_{n-m},$$

where the asterisk represents complex conjugation. The cross correlation will display a peak at the time delay (or sequence index n) corresponding to the target range. To extract the Doppler shift of the reflected waveform, it is convenient to work in the frequency domain. The convolution of the cross correlation of reference and signal sequences may be efficiently computed as the inverse discrete Fourier transform (IDFT) of the product of the signal spectra: $y_n = \text{IDFT}\{R^*S\}$, where the spectra $R_k$ and $S_k$ are computed from the reference and signal sequences respectively via discrete Fourier transform (DFT's). Performing a circular shift of the signal spectrum sequence $S_k$ is equivalent to shifting the received radar signal in frequency. If the signal is uniformly Doppler shifted due to target motion; then there will be an index that shifts the signal to baseband where it correlates with the reference. Multiple shifts are employed so that an arbitrary Doppler shift is accommodated in one of the bins. Accordingly, a two-dimensional approach such as is illustrated in FIG. 6 is performed.

The classic radar range equation is:

$$R_{max} = \left[\frac{P_t \tau G_t G_r \sigma \lambda^2 F}{(4\pi)^3 k_B T_{eff} D_0 C_B L}\right]^{\frac{1}{4}}$$

where $P_t$ is the transmit power at the T/R module output connector, G is the transmit or receive antenna gain including scan and taper loss, F is the two-way pattern propagation factor, set here to unity for free space, $D_0$ is the "detectability factor" or signal to noise ratio required for target detection, $C_b$ is one when matched filter or correlator processing is used, and L is a factor greater than one that accounts for losses between electronics and radiating aperture. In practice receive losses can be accounted for in the effective receive temperature $T_{eff}$ whereupon the loss factor L refers only to transmit losses. In the present system we set L to one for simplicity and since operation is continuous wave rather than pulsed, identify $\tau$ as the signal integration time. Other symbols have their usual meaning. With these substitutions, the range simplifies to $$R_{max} = \left[\frac{P_t \tau G_t G_r \sigma \lambda^2}{(4\pi)^3 k_B T_{eff} D_0}\right]^{\frac{1}{4}}.$$

As can be appreciated by one of skill in the art, in order to increase sensitivity, signals received at the passive proximity detection system 204 can be integrated over time.

Figure 8:
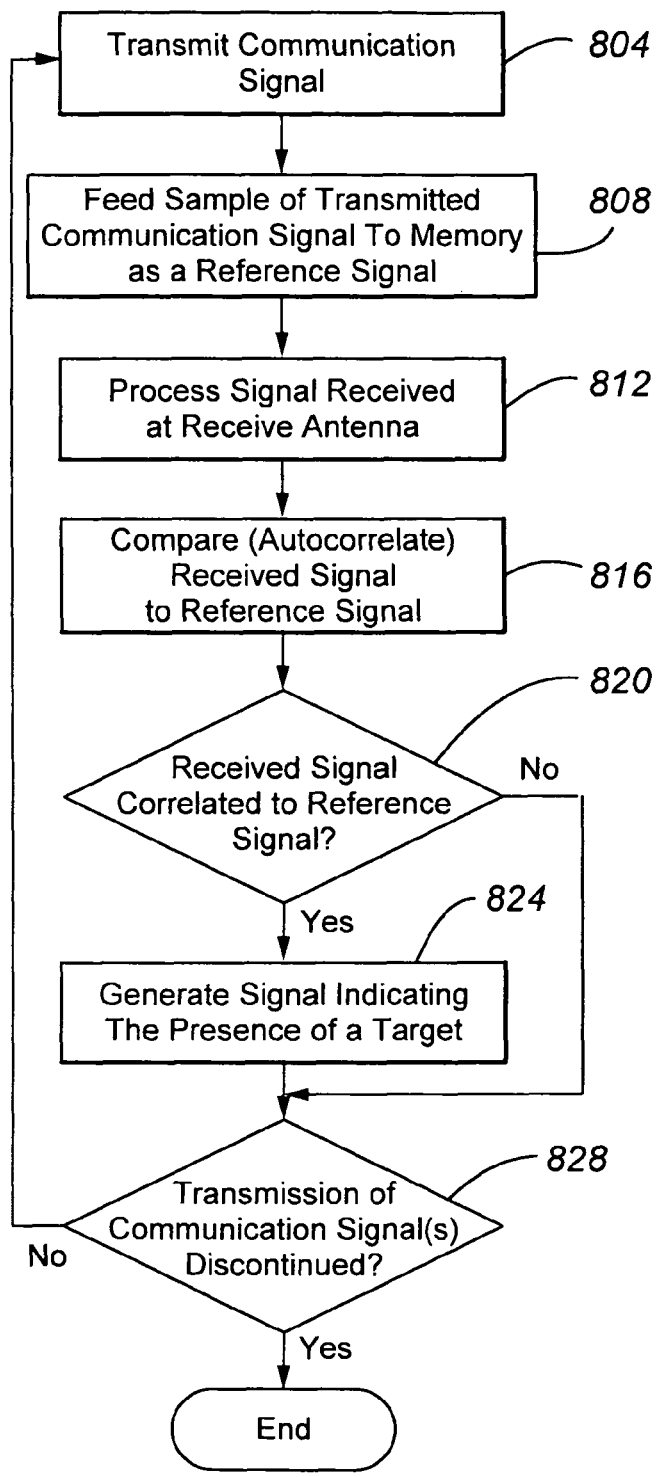
FIG. 8 is a flow chart depicting aspects of the operation of a passive proximity detection system in accordance with embodiments of the present invention.

FIG. 8 is a flow chart depicting aspects of the operation of a passive proximity detection system 204 in accordance with embodiments of the present invention. Initially, at step 804, a communication signal 212 is transmitted by a transmitting antenna 208. In general, the content of the transmitted signal 212 is of no importance to the passive proximity detection system. However, the good correlation properties of a typical communication signal 212 is used to advantage by the passive proximity detection system 204.

A sample or reference sample sequence of the transmitted communication signal 212 is fed to memory 552 for use as a reference signal (step 808). The sample of the transmitted communication signal 212 can be obtained as a transmitted signal 552 received by a downlink sampling antenna 528 operating as a parasitic element. Alternatively, the sample 532 of the transmitted communication signal 212 can be obtained by a PPDS receive antenna 228, functioning as both a parasitic element with respect to the transmitted communication signal 212, and as a receiver of energy reflected 224 from a target 108 when a target is in the vicinity of the satellite 100. Alternatively or in addition, a sample 532 of the transmitted communication signal 212 may be obtained as a signal communicated via a transmission line from payload electronics 216 to the passive proximity detection system 204 components. Where the sampled signal 532 is obtained by an antenna 228 and/or 528, that signal may be amplified in a low noise amplifier 508 and/or 536. The amplified signal, or the signal provided from the payload electronics 216 via a transmission line, may be processed prior to storage in memory. For example, the signal may be down converted to a baseband or complex envelope by mixing the signal sample with a signal from the local oscillator 504 that provides a modulation signal for the transmitted communication signal 212. In addition, analog to digital conversion can be performed. Moreover, analog to digital conversion may be in connection with timing information provided by a timing circuit 506 included as part of the satellite payload 214.

Energy 224 reflected from a target 108 is received at one or more PPDS receive antennas 228. The signal received by a PPDS receive antenna 228 (the received sample sequence) is then processed (step 812). Processing the received sample sequence or reflected energy 224 can include amplifying that signal in a low noise amplifier 508, and mixing that signal with a signal from the local oscillator 504 in a mixer 512 to obtain a baseband signal or complex envelope. The processing may further include converting the signal to the digital domain in an analog to digital converter 520. Operation of the analog to digital converter 520 may be coordinated with other signals by reference timing information provided by the timing circuit 506.

A comparison of the down converted reference signal or reference sample sequence 532 to the down converted reflected signal or received sample sequence 224 is then performed (step 816). In accordance with embodiments of the present invention, the comparison comprises an autocorrelation between the signals. Moreover, in accordance with embodiments of the present invention, autocorrelation may be performed between the sample of reflected energy 224 and multiple versions of the reference signal 532 that have been shifted in frequency by different amounts, in order to accommodate potential Doppler shifts experienced by the reflected energy 224 as a result of the target 108 having a non-zero relative radial velocity with respect to the satellite 100. As noted elsewhere herein, the frequency shift may be implemented as a circular shift in the frequency domain of the reference signal 532. Alternatively or in addition, digital processing may be used to determine the amount of Doppler shift.

At step 820, a determination is made as to whether the comparison indicates that the received reflected signal 224 is correlated to the reference signal 532. If the signals are correlated, a further signal indicating the presence of a target in the vicinity of the satellite 100 is output (step 824). The output signal may be provided to a control or monitoring authority or function included in the satellite 100, for instance over a wireline connection from the PPDS controller 562 to that authority, may be transmitted to a remote control or monitoring authority, and/or may be transmitted to a control or monitoring authority on another platform. That signal can then be acted on, for example by moving the satellite 100, discontinuing or altering the transmitted communication signal 212, initiating defensive measures, or taking other action. Accordingly, the signal from the PPDS system 204 can be used to benefit the satellite 100 or other platform and the associated payload. Accordingly, the relationship between the PPDS system 204 and the platform 100 including the transmitting antenna 208, is cooperative. The signal indicating the presence of a target may further include information regarding the range of the target 108 from the satellite 100. In particular, such range information can be calculated from the roundtrip travel time of reflected energy 224 that has been correlated to a sample of the reference signal 532. In addition, the output signal can include information regarding the relative radial velocity of a detected target 108. After generating an output signal indicating the presence of a target 108, or determining that the PPDS receive antenna 528 has not received a reflected signal 224 that can be correlated to the transmitted signal 212, a determination is made as to whether the transmission of a communication signal 212 has been discontinued (step 828). If the transmission of a communication signal 212 has not been discontinued, the process may return to step 904. If the transmission of a communication signal 212 has been discontinued, the process may end.

Where a passive proximity detection system 204 in accordance with embodiments of the present invention utilizes multiple PPDS receive antennas 228, the process of receiving and correlating or attempting to correlate received signals comprising energy reflected 224 from a target 108 to samples 532 of a transmitted signal 212 is performed for each such PPDS receive antenna 528. In addition to enabling a larger coverage area and/or greater detection resolution, the provision of multiple PPDS receive antennas 528 can provide a location determination capability. In particular, the location of a target 108 relative to the satellite 100 can be determined with some specificity depending on the orientation and coverage area of the particular PPDS receive antenna or antennas 228 that receive energy 224 reflected by that target 108.

In accordance with still other embodiments of the present invention, multiple communication antennas 208 can be associated with a satellite payload 214, and transmissions from all transmitting antennas 208 associated with the satellite 100 can be used to probe the area around the satellite 100 for nearby targets 108. Where multiple transmitting antennas 208 are included, and where a passive proximity detection system 204 associated with the satellite 100 is to use all of the signals transmitted by the transmitting antennas 208 as sources of energy for probing the vicinity around the satellite 100 for targets 108, a processing channel for each transmitted signal 212 may be provided for each PPDS receive antenna 528.

Although examples given in the present description have discussed the use of communication signals 212 to probe an area around a satellite 100 for targets 108, embodiments of the present invention are not so limited. For instance, any transmitted energy having good correlation properties can serve as a transmitted signal 212 that is used by a passive proximity detection system 204 in accordance with embodiments of the present invention to probe for targets 108. For example, a GPS satellite message transmission may be used as a transmitted signal 212 providing energy for probing the vicinity of a satellite 100. Moreover, the transmitted signal 208 is generally generated for the purpose of transmitting information and data, and such transmission is not controlled or affected by the use of a passive proximity detection system of the energy in the transmitted signal 208 to probe the vicinity of a satellite for targets. Therefore, the transmitted signal is primarily a communication signal, and secondarily a signal used to probe the vicinity of a satellite.

As used herein, a target 108 may be considered to be within the vicinity of a satellite 100 if that target 108 is close enough that energy from the transmission of a signal 212 reflected from the target 108 and received at a PPDS receive antenna 228 can be processed and correlated to a sample of the transmitted signal 212 as described herein. In accordance with other embodiments of the present invention, a target 108 may be considered to be within the vicinity of a satellite 100 if that target 108 is within about 10 kilometers of the satellite 100. In addition, although the use of energy within a side lobe of the beam pattern associated with a transmitting antenna 208 has been discussed, it should be appreciated that energy contained within a main beam of a transmitting antenna 208 can also be used for target 108 detection in accordance with a passive proximity detection system 204 in accordance with embodiments of the present invention. Moreover, as used herein, the term side lobe should be understood to include any energy comprising a signal 212 transmitted by a transmitting antenna 208, including a main beam or lobe, a side lobe or back lobe.

In accordance with embodiments of the present invention, a passive proximity detection system 204 may be provided as a package including a number of PPDS receive antennas 228, and processing electronics, that can be incorporated into a satellite 100 by attaching the passive proximity detection system 204 to and/or integrating the system 204 with the satellite 100 bus or other platform. In addition, incorporation of a passive proximity detection system 204 with a satellite 100 can include completing a signal feed from a local oscillator 504 and/or a timing circuit 506 associated with the satellite payload 214 providing a transmitted signal 212 that will be used to probe the vicinity of the satellite 100. In addition, the passive proximity detection system 204 may provide an output to other components associated with the satellite 100, for example to communicate the presence of a target 108 in the vicinity of the satellite 100 to control electronics either on board the satellite 100 or associated with another satellite 100 or a ground station, and/or to control personnel. Accordingly, it can be appreciated that a passive proximity detection system in accordance with embodiments of the present invention can be incorporated into a satellite 100 with a minimal amount of interconnection. In accordance with still other embodiments of the present invention, a passive proximity detection system 204 may be deployed on a satellite 100 on which the passive proximity detection system 204 is the only payload, and such that signals transmitted by other, nearby satellites are used to probe for targets in the vicinity of the satellite carrying the passive proximity detection system 204, and the payload 214 providing the transmitted signal 212. According to such embodiments, timing information can be recovered from sampled reference signals.

Embodiments of the present invention may incorporate various PPDS receive antenna 528 designs and configurations. For example, as discussed above, a plurality of patch antennas may be deployed around the satellite 100, to provide coverage in any direction. As a further example, a PPDS receive antenna 528 may comprise an array antenna that incorporates phase comparison for direction finding.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A proximity detection system, comprising:
   a communication signal transmitter;
   a transmitting antenna comprising a first antenna, wherein the transmitting antenna is connected to the communication signal transmitter and is operable to transmit a communication signal from the communication signal transmitter as a communication signal transmission;
   a receiving antenna comprising at least one of the first antenna and a second antenna;
   a memory, wherein the memory is operable to store a reference sample sequence of the communication signal transmission;
   a signal processor,
      wherein the signal processor is operable to compare the stored reference sample sequence of the communication signal transmission to a received sample sequence received by the receiving antenna,
      wherein a signal indicating the presence of a target in response to a match between the stored reference sample sequence of the communication signal transmission and the received sample sequence received by the receiving antenna is output by the signal processor, and
      wherein said communication signal transmitter and said signal processor are interconnected to a first platform.

2. The system of claim 1, wherein said transmitting antenna comprises a first antenna and said receiving antenna comprises a second antenna.

3. The system of claim 1, wherein the memory is connected to the receiving antenna, and wherein the memory receives the reference sample sequence of the communication signal transmission from the receiving antenna.

4. The system of claim 1, further comprising:
   a direct path signal line connecting the communication signal transmitter to the memory, wherein the memory receives the reference sample sequence of the communication signal transmission from the direct path signal line.

5. The system of claim 1, further comprising:
   a plurality of receiving antennas.

6. The system of claim 1, further comprising:
   a plurality of transmitting antennas, wherein each transmitting antenna is operable to transmit a different communication signal, whereby a plurality of communication streams are transmitted, and wherein the reference sample sequence comprises a reference sample sequence from each of the plurality of transmitted communication streams.

7. The system of claim 1, further comprising:
   a local oscillator, wherein the local oscillator provides a transmission frequency to the communication signal;
   a mixer interconnected to the local oscillator and to the receiving antenna, wherein the transmission frequency is mixed with a signal received by the receiving antenna.

8. The system of claim 1, further comprising:
   a first frequency shifter, wherein the first frequency shifter shifts a frequency of a first instance of the received sample sequence received by the receiving antenna by a first amount, wherein a signal indicating a relative radial velocity of the target is generated in response to a match between the stored reference sample sequence of the communication signal transmission and the received sample sequence received by the receiving antenna and shifted by a first amount by the first frequency shifter;
   a second frequency shifter, wherein the second frequency shifter shifts a frequency of a second instance of the received sample sequence received by the receiving antenna by a second amount.

9. The system of claim 1, wherein a Doppler shift is determined digitally.

10. The system of claim 1, wherein a signal indicating a range of a target is output by the signal processor in response to a match between the stored reference sample sequence of the communication signal transmission and the received sample sequence received by the receiving antenna is output by the signal processor.

11. A passive proximity detector system, comprising:
    a receive antenna;
    a memory, wherein a first sample sequence of a first transmitted communication signal is stored in the memory, and wherein the first sample sequence is a first reference sequence;
    a signal processor operable to generate an output signal indicating the presence of an object in response to a successful correlation of a first received signal sequence and the first sample sequence of the first transmitted communication signal, wherein the first received signal sequence and the stored first sample sequence of the first transmitted signal are correlated by the signal processor, and wherein said first transmitted communication signal is transmitted by a first communication signal transmitter that is co-located with said signal processor;

an output, wherein the signal indicating the presence of an object is output by the passive proximity detector.

12. The system of claim 11, further comprising:

a plurality of receive antennas, wherein each of the plurality of receive antennas has a different orientation.

13. The system of claim 11, further comprising:

an input for a local oscillator signal, wherein the local oscillator signal is used to frequency convert the first transmitted communication signal prior to sampling to produce the first reference sequence, wherein the local oscillator signal is used to frequency convert the first received signal from the receiving antenna prior to sampling to produce a second sample sequence.

14. The system of claim 13, further comprising:

a local oscillator, wherein an output from the local oscillator is interconnected to the input for a local oscillator signal.

15. The system of claim 11, further comprising:

an input for the first transmitted communication signal.

16. A method for detecting an object, comprising:

sampling a transmitted communication signal, wherein said transmitted communication signal is transmitted from a first communication signal transmitter at a first location;

obtaining from a receiving antenna a received signal that includes a version of the transmitted communication signal, wherein said receive antenna is located at said first location;

producing a correlation function using the received signal and the transmitted communication signal;

in response to correlating the received signal to the transmitted communication signal, generating a signal indicating the presence of an object.

17. The method of claim 16, wherein correlating the received signal to the transmitted communication signal includes delaying one signal relative to the other to determine a range to the object.

18. The method of claim 17, wherein an amount by which said transmitted communication signal is delayed provides a single range from said first location to said object.

19. The method of claim 16, wherein correlating the received signal to the transmitted communication signal includes frequency shifting one or both of the signals to determine presence and radial velocity of the object.

20. The method of claim 16, further comprising:

receiving a second signal at a second receive antenna;

correlating the received second signal to the transmitted communication signal;

in response to correlating the received second signal to the transmitted communication signal, generating a signal indicating the presence of and bearing to the object.

21. The method of claim 16, wherein obtaining the transmitted communication signal includes receiving the transmitted communication signal from a transmitting antenna over a transmission line.

* * * * *